United States Patent

[11] 3,612,881

[72] Inventor Paul B. King
 Mountain Lakes, N.J.
[21] Appl. No. 815,886
[22] Filed Apr. 14, 1969
[45] Patented Oct. 12, 1971
[73] Assignee The Cessna Aircraft Company
 Wichita, Kans.

[54] RELATIVE MOVEMENT DETECTOR
 16 Claims, 5 Drawing Figs.
[52] U.S. Cl............................................. 250/204,
 250/209, 250/237, 356/172
[51] Int. Cl............................................. G01b 15/00,
 G01j 1/36
[50] Field of Search............................................. 250/201,
 202, 204, 209, 210, 237; 356/172

[56] References Cited
 UNITED STATES PATENTS
2,335,163 11/1943 Smith........................... 250/231 X
2,685,064 7/1954 Bergen.......................... 250/231 X
3,012,469 12/1961 Clayborne..................... 356/172
3,229,102 1/1966 Spencer et al. ............... 250/210 X
3,412,877 11/1968 Yee Lee et al................ 250/231 X
3,444,384 5/1969 Horeczky....................... 250/204 X
3,480,779 11/1969 Hand, Jr. ...................... 250/210 X Primary Examiner—Roy Lake
Assistant Examiner—E. R. LaRoche
Attorney—Beveridge & De Grandi ABSTRACT: Relative movement is detected by directing light through an apertured baffle to form a beam which strikes a pair of adjacent photosensitive devices. Transverse relative movement of the baffle moves the beam to change the relative amount of light striking the photosensitive elements to generate a signal indicative of the displacement of the baffle. A beam-splitting shield may be located between the baffle and the photosensitive elements to increase the sensitivity of the apparatus.

PATENTED OCT 12 1971　　3,612,881
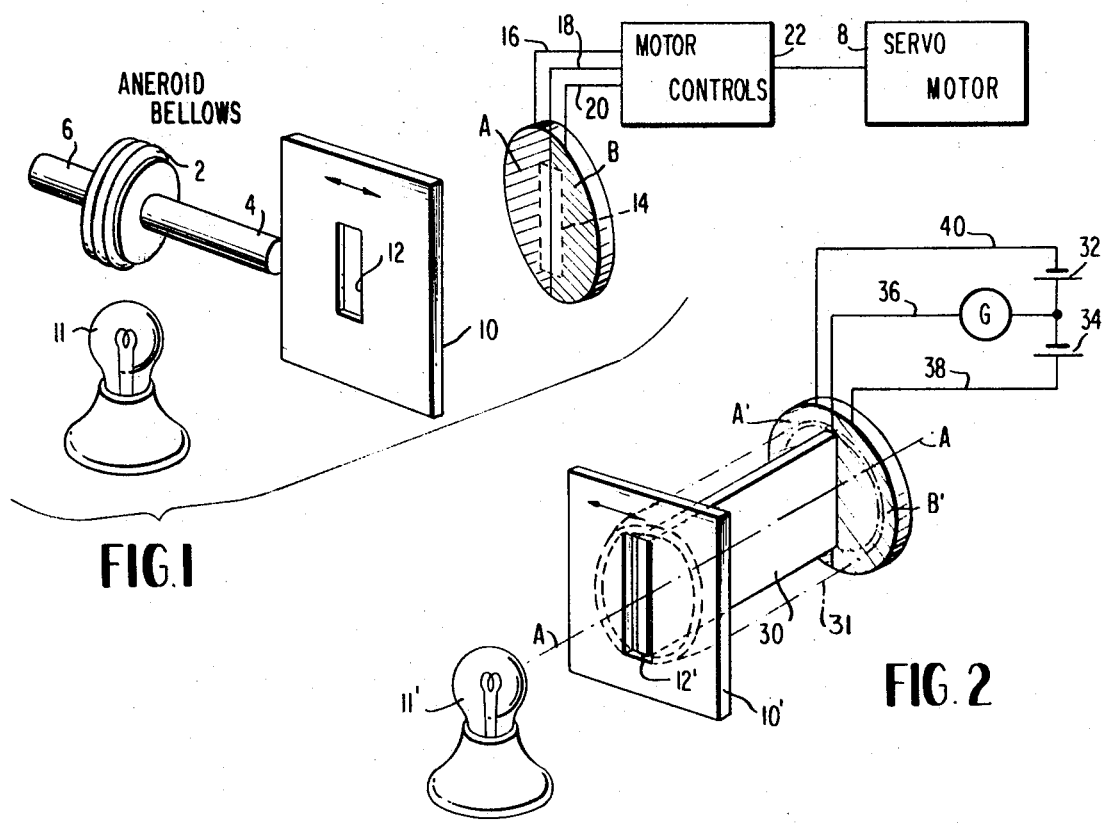
FIG.1
FIG.2
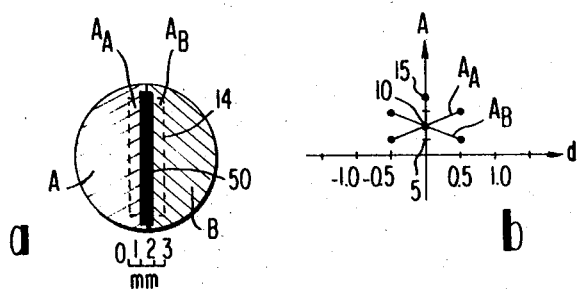
FIG.3
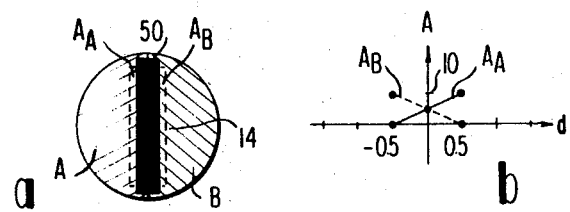
FIG.4
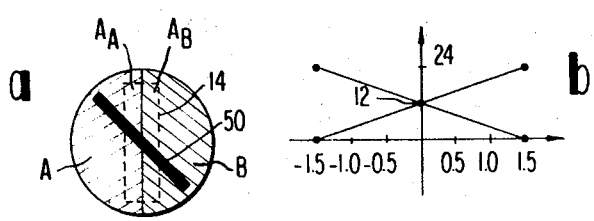
FIG.5
PAUL B. KING, INVENTOR
BY Browne, Schuyler & Beveridge
ATTORNEYS

RELATIVE MOVEMENT DETECTOR

BACKGROUND

Numerous forms of instrumentation require the detection of relative movement between a pair of members. Such movement is normally produced by a force which is generated upon the change of some physical characteristic of the system. For example, one element may be connected to an aneroid bellows so that relative movement is created when there are changes in the ambient pressure. Forces also may be generated to indicate parameters such as weight, acceleration, temperature or other physical characteristics of the system.

As in the present invention, previous systems have detected relative movement by moving an apertured baffle relative to a photosensitive element in order to obtain a readout from the photosensitive element which is indicative of displacement. These previous systems have suffered from various disadvantages which are obviated by the present invention. For example, in the past, these systems have often employed only a single photosensitive element which may be subject to fatigue and will produce different signals depending upon its temperature. The adverse effects of temperature drift and fatigue are avoided by this invention which uses a pair of photosensitive elements and balancing circuitry.

Furthermore, previous efforts to measure relative movement using photosensitive means have not had the degree of sensitivity which is essential for some types of apparatus. Utilizing the invention described herein, sensitivity capable of detecting very slight movement is possible, and the sensitivity may readily be adjusted by making minor changes to the apparatus, sometimes without replacing any parts.

In order to obviate some of the aforementioned disadvantages of prior art devices of this type, the principal objects of this invention are to minimize inaccuracies which result when using a single photosensitive element in movement detecting apparatus, to increase the sensitivity of such devices, and to provide for convenient sensitivity adjustments.

SUMMARY

This invention involves apparatus for detecting the relative positioning between a pair of members by using a pair of adjacent light sensitive elements which intercept a beam of light directed thereagainst through a baffle. Relative movement of the beam with respect to the photosensitive elements changes the differential between the light striking one of the photosensitive elements and the light striking the other of the photosensitive elements. Movement of the light beam may be produced by moving any of the light source, the baffle or the photosensitive elements.

A refinement of the basic concept of this invention involves a light shield which splits the beam striking the photosensitive elements into two portions. This provides a better definition of the beam and increases the sensitivity of the apparatus. By changing the orientation or transverse dimension of this shield, the sensitivity of the apparatus may be adjusted.

BRIEF DESCRIPTION OF THE DRAWINGS

FIG. 1 is a perspective schematic view of the invention as applied to autopilot controls for an aircraft;

FIG. 2 is a schematic perspective view of a modified form of the invention which utilizes a beam splitting shield between the movable baffle and the photosensitive elements;

FIG. 3a is a diagrammatic view showing the exposed areas of the photosensitive elements using a light splitting shield having a particular thickness;

FIGS. 3b and 3c are graphs showing variations in the exposed areas of the photosensitive elements in FIG. 3a as a function of relative movement;

FIG. 4a is a diagrammatic view similar to FIG. 3, but showing a light splitting shield of a greater transverse dimension;

FIGS. 4b and 4c are graphs showing variations in the exposed areas of the photosensitive elements of FIGS. 4a as a function of beam movement;

FIG. 5a is a diagrammatic view similar to FIG. 3 but showing the light splitting shield in a inclined position; and FIGS. 5b and 5c are graphs showing variations in the exposed areas of the photosensitive elements of FIG. 5a as a function of beam movement.

DESCRIPTION OF A PREFERRED EMBODIMENT

As previously discussed, the position sensing apparatus of this invention may be used in a variety of ways such as for sensing the relative position between two members whose relative position is changed in response to changes in their physical environment. FIG. 1 shows such a system which is adapted for use in conjunction with autopilot apparatus. This system involves an aneroid bellows 2 which is connected by rod 4 to a baffle 10 which has a transparent portion formed by slot 12. One end of the bellows is supported on an axially adjustable rod 6 which remains stationary during the operation of the disclosed sensing means. A servomotor 8 is responsive to signals from the apparatus to position the control surfaces of the aircraft and maintain the aircraft at a substantially constant altitude.

Of course, changes in the position of the baffle plate 10 will reflect changes in the ambient atmospheric pressure since it is responsive to expansion and contraction of the aneroid bellows 2. As the altitude increases and atmospheric pressure decreases, the bellows 2 will expand and move the baffle 10 to the right. Contrariwise, a reduction in atmospheric pressure will contract the bellows and move the baffle 10 to the left.

The position of the baffle is sensed by directing a beam of light through its aperture or slot 12, and intercepting this light beam on the face of a pair of photosensitive elements A and B. The light may be produced by the light source 11. When the plate 10 is in its null position, the light striking the faces of the photosensitive elements A and B will be at the location indicated in broken lines at 14.

The photosensitive elements A nd B may be of various types. For example, they may be cells which convert the light energy received thereby into an electrical current which may be analyzed using any conventional circuitry, or they may be photoresistive elements whose electrical conductivities vary in accordance with the amount of light which strikes them. A device of the latter type is shown and may be a hermetically sealed dual element photoconductive cell of the type No. CL705L/2 manufactured by Clairex Corporation of New York, N.Y. The sensing material on these cells is cadmium sulfide and their resistance varies from 50,000 ohms to 7,500 ohms as the light striking them varies from total darkness to 2 foot-candles. They are operable throughout wide temperature and voltage ranges.

As previously mentioned, movement of the baffle 10 will change the relative amount of light striking the photosensitive elements A and B. As the baffle moves to the right as seen in FIG. 1, the amount of light striking the element B will become greater than that striking element A. Movement of the baffle 10 to the left will produce a converse effect.

The signals indicative of the amount of light striking each of the cells A and B are passed through electrical conductors 16, 18 and 20 to the motor control housing 22 where a conventional balancing circuit generates an error signal when there is a resistance difference between elements A and B. This error signal actuates the servomotor 8 to move the control surfaces of the aircraft.

Now, the operation of this apparatus in conjunction with aircraft autopilot controls will be described. Initially, the rod which constitutes the stationary end of the aneroid bellows 2 is moved axially to a position which corresponds to the desired altitude. Movement to the left as seen in FIG. 1 will reduce the altitude setting while movement to the right will increase the altitude setting. Assuming that the aircraft is at the desired altitude, equal amounts of light from the source 11 will strike the photosensitive elements A and B, so that there is no error signal and consequently no operation of the servomotor 8.

Once the aircraft altitude exceeds the altitude setting of the apparatus, the aneroid bellows 2 will expand to move the baffle 10 to the right, thereby causing more light from the source 11 to strike photosensitive element B than photosensitive element A. This difference will be detected as the balancing circuit becomes unbalanced. This unbalanced state generates an error signal which actuates the servomotor to move the aircraft control surfaces to reduce the altitude. Obviously, a reduction in altitude will move the baffle 10 to the left so that the light striking photosensitive element A will be greater than that striking photosensitive element B. This will generate an error signal which moves the aircraft control surfaces to increase the altitude.

It has been found that the sensitivity of apparatus of this nature may be affected significantly by interposing a shield between the baffle 10 and the photosensitive elements. Such an arrangement is shown in FIG. 2 where the elements have been given primed numerals which correspond to like elements in FIG. 1. As before, light from source 11' passes through an aperture 12' in movable baffle 10' against side-by-side photosensitive elements A' and B'. However, in this case, there is a beam-splitting shield 30 which is a flat plate lying in a plane coincident with an axis A—A which extends from the light source 11' to the boundary between the photosensitive elements A' and B'. This shield 30 is preferably mounted so that it may be inclined about the axis A—A to vary the sensitivity of the apparatus in a manner which will be described below.

The FIG. 2 apparatus is shown as being connected to an ammeter G which is located in a circuit loop, common to the photosensitive elements A' and B'. A potential is imposed across each of the elements A' and B' by the batteries 32 and 34. Of course, when the amount of light striking both elements A' and B' is equal, no current will pass through the conductor 36 which contains the gage G. On the other hand, when the baffle 10' moves to the right so that more light strikes photosensitive element B' than strikes element A', the resistance across element B' will diminish and that of element A' will increase, thereby causing a greater current flow through the conductor 38 than through the conductor 40. This unbalanced condition will result in a current flow through the common conductor 36, the magnitude of which will be indicated by the meter G to reflect the amount of displacement. Movement of the baffle 10' to the left will create a similar effect in another direction.

Preferably, the shield 30 is supported within an open ended cylindrical body shown in broken lines at 31 which is concentric with the axis A—A, and means are provided for holding the cylinder in a fixed position to maintain the shield 30 at a selected angle of inclination. In order to prevent unwanted reflection of the split light beam, the shield 30 and the interior of its supporting cylinder are coated with a light-absorbing material such as lusterless black paint.

The shield 30 is known to increase the sensitivity of the apparatus and to provide sensitivity adjustments if it is mounted for inclination about the axis A—A. This is due to two factors. First, the shield 30 acts as a masking device which reduces the amount of light striking each of the photosensitive elements so that for any given movement of the baffle 10', there will be a significantly greater difference in the ratio between the light striking elements A' and B' than would exist if there were no shield. This concept will be understood more fully in conjunction with FIGS. 3 and 4. A second effect of the shield 30 is its beam-splitting effect which minimizes the dispersion of light in the vicinity of the adjacent portions of the photosensitive elements A' and B'. This is of particular significance when it is not practical to provide a light source 11' which is capable of directing parallel rays through the aperture 12' of the baffle 10'.

The significance of the shield when it acts as a masking means, particularly as it relates to the sensitivity adjustment of the apparatus, will be described in connection with FIGS. 3, 4 and 5. The "a" portion of each of these figures shows the photosensitive elements with the broken line representation 14 showing the area occupied by the beam passing through the apertured baffle. The shadow cast by the shield 30 is shown at 50 so that the light striking the photosensitive elements hits area $A_A$ of element A and area $A_B$ of element B. For purposes of these examples, it will be assumed that the area 14 has dimensions of 3×10 millimeters. The shadow 50 has a width of 1 millimeter in FIGS. 3 and 5, and a width of 2 millimeters in FIG. 4. Of course, the shadow remains fixed with respect to the photosensitive elements A and B during operation of the device, and relative movement is reflected by movement of the area 14.

The "b" and "c" portions of FIGS. 3, 4 and 5 are graphs which indicate the exposed areas $A_A$ and $A_B$ as a function of displacement of the area 14 in a positive direction to the right and in a negative direction to the left of the null position shown in the "a" portion of the respective figures. Accordingly, it will be seen in FIG. 3b, the apparatus of FIG. 3a operates to detect movement of the area 14 only to 0.5 millimeters from its null position. The area $A_A$ is at a minimum, of 5 square millimeters when the area 14 is displaced 0.5 millimeters from its null position, and, $A_A$ increases progressively as area 14 moves to the right until it reaches its maximum of 15 square millimeters when the area 14 is 0.5 millimeters to the right of its null position. The area $A_b$ of course diminishes during movement of the area 14 from left to right.

Since this apparatus operates by detecting the difference in the amounts of light striking the elements A and B, this differential is illustrated in FIG. 3 which shows the value of $A_A$ minus $A_A$ goes from minus 10 square millimeters to a value of plus 10 square millimeters as the area 14 moves from its extreme left to its extreme right position. This difference is electronically analyzed to indicate measurements or to produce an error signal which restores the area 14 to its null position.

Apparatus of the type illustrated in FIG. 3 may have its sensitivity increased by replacing the beam splitting shield 30 with a thicker shield. The principle involved is illustrated in FIG. 4 where the area 14 again has dimensions of 3×10 millimeters. In this case, however, the thickness of the shield and the shadow 52 cast thereby has been increased to 2 millimeters. Accordingly, as shown in FIG. 4b the effective range of movement is again 0.5 millimeters to either side of the null position. At the extreme left position of area 14, $A_A$ is zero. This quantity increases as the area 14 moves to the right until it reaches a maximum of 10 square millimeters. The quantity $A_B$ progresses from a maximum of 10 square millimeters to zero as the area 14 moves from its extreme left position to its extreme right position. The electronically evaluated quantity in this case is shown in FIG. 4c where $A_A$ minus $A_B$ ranges from minus 20 to plus 20 within the effective range of movement of the area 14. This, of course, produces a greater error signal and greater sensitivity than the apparatus using the thinner shield described in FIG. 3.

FIG. 5 involves the same apparatus shown in FIG. 3, except that the shield has been rotated 45° so that the shadow has a smaller area within the area 14 of the beam. The effect of this 45° inclination is shown in FIGS. 5b and 5c. One effect is co increase the effective range of movement of the area 14 within which measurements may be made. Another effect is that the sensitivity is less. For example, $A_A$ is zero when the area 14 is 1.5 millimeters to the left of the null position shown in FIG. 5a. This quantity $A_A$ increases until it reaches its maximum of approximately 24 square millimeters when the area 14 is 1.5 millimeters to the right of its null position. The converse is true of $A_B$. A comparison of FIG. 5c with FIG. 3c will indicate that the differential $A_A$ minus $A_B$ when the displacement from the null position is 0.5 millimeters is slightly less in the case of the FIG. 5 device. This, of course, results in reduced sensitivity.

Significantly, in the case of the FIG. 5 embodiment changes in the masking effect is only one of the changes produced by inclination of the shield. Another change which occurs when the shield is inclined is that the diffusion or interference between adjacent portions of the light beam at the area which strikes the line intermediate the two elements A and B is not defined as well, so that the sensitivity is also reduced in this manner. In conjunction with this, it will be understood that apparatus of the type shown in FIG. 1 which has no shield 30 is less sensitive than apparatus than that of the type shown in FIG. 2.

It will be appreciated from the foregoing description that I have provided a new and useful apparatus for detecting relative movement between two members in a fashion which is most accurate and which lends itself to relatively uncomplicated modifications which will vary its sensitivity.

I claim:

1. Apparatus for detecting the relative positioning of a pair of relatively movable members, comprising
   an opaque baffle with a transparent portion, said baffle being attached to a first of the relatively movable members,
   means directing light through the transparent portion to form a beam having the transverse shape of the transparent portion,
   a pair of light sensitive elements attached to a second of the relatively movable members, said light sensitive elements being located to intercept different portions of the beam and being relatively positioned where a plane therebetween which lies parallel to the beam is not parallel to the direction of relative movement of the relatively movable members whereby movement between the relatively movable members will change the differential between the light striking one light sensitive element and the light striking the other light sensitive element,
   an opaque beam-splitting body located in the light beam between the baffle and the light sensitive elements and being oriented in a plane parallel to the beam to divide the beam into two beam portions, said opaque beam-splitting body being supported for rotation about an axis parallel to the beam to permit sensitivity adjustment of the apparatus, and means for holding the opaque body stationary in any of its adjusted positions.

2. Apparatus according to claim 1 wherein the opaque body is a flat member which is in a plane parallel to the beam.

3. Apparatus according to claim 2 having a tubular support permanently attached to the flat member and forming a passage for the beam.

4. Apparatus for detecting the relative positioning of a pair of relatively movable members, comprising
   a light source unit,
   a baffle unit in the path of light from the light source unit for defining a beam of light,
   a light sensing unit having a pair of adjacent light sensitive elements located in the path of said beam where different portions of the beam will strike each of the light sensitive elements,
   means for moving one of said units relatively to the other units in a direction which will move the beam relative to the light sensitive elements and change the differential between the quantum of light striking one light sensitive element to the quantum of light striking the other light sensitive element a beam splitting shield which is a planar member having its faces oriented parallel to the beam, said shield being normally stationary with respect to the light sensing elements, said shield being located where it will split the beam of light into two portions and cast a shadow across both of said light sensitive elements,
   and circuit means for producing a signal indicative of said differential.

5. Apparatus according to claim 4 wherein the baffle has an opaque portion and a transparent portion; whereby the beam has a uniform light intensity throughout its transverse dimension.

6. Apparatus according to claim 4 wherein the light source unit and the light sensing unit are relatively fixed, and the baffle is relatively movable with respect to the light source unit ad the light sensing unit.

7. Apparatus according to claim 4 wherein the baffle is opaque and has an elongated transparent portion of substantially uniform width.

8. Apparatus according to claim 4 wherein the shield is oriented to split the beam into two portions each having a transverse cross section which is elongated and of substantially uniform width.

9. Apparatus according to claim 4 wherein the shield is inclinable about an axis which extends from between the light sensitive elements to the light source unit.

10. Apparatus for detecting the relative positioning of a pair of relatively movable members, comprising
    a light source unit,
    a baffle unit in the path of light from the light source unit for defining a beam of light,
    a light sensing unit having a pair of adjacent light sensitive elements located in the path of said beam where different portions of the beam will strike each of the light sensitive elements,
    means for moving one of said units relatively to the other units in a direction which will move the beam relative to the light sensitive elements and change the differential between the quantum of light striking one light sensitive element to the quantum of light striking the other light sensitive element, a planar beam splitting shield having its faces oriented parallel to the beam and being normally stationary with respect to the light sensing elements, said shield being located where it will split the beam of light into two portions and cast a shadow across both of said light sensitive elements, said shield being inclinable about an axis which extends from between the light sensitive elements to the light source unit to permit sensitivity adjustment of the apparatus,
    and circuit means for producing a signal indicative of said differential.

11. Apparatus according to claim 10 wherein the shield is movable to a position of maximum sensitivity where it splits the beam into two portions each having a transverse cross section which is elongated and of substantially uniform width.

12. Apparatus for sensing altitude changes by detection of the relative positioning of a pair of relatively movable members, comprising
    an opaque baffle with a transparent portion, said baffle being attached to a first of the relatively movable members,
    means directing light through the transparent portion to form a beam having the transverse shape of the transparent portion,
    a pair of light sensitive elements attached to a second of the relatively movable members, said light sensitive elements being located to intercept different portions of the beam and being relatively positioned where a plane therebetween which lies parallel to the beam is not parallel to the direction of relative movement of the relatively movable members,
    aneroid bellows means for moving one of said relatively movable members in response to changes in atmospheric pressure; whereby movement between the relatively movable members produced by changes in atmospheric pressure will change the differential between the light striking one light sensitive element and the light striking the other light sensitive element.

13. Apparatus according to claim 12 in combination with an aircraft having altitude-affecting control surfaces, and means for moving said control surfaces in response to the differential between the light striking one light sensitive element and the light striking the other light sensitive element.

14. Apparatus for sensing altitude changes by detection of the relative positioning of a pair of relatively movable members, comprising
    a light source unit,
    a baffle unit in the path of light from the light source unit for defining a beam of light having at least one portion, a light sensing unit having a pair of adjacent light sensitive elements located in the path of said beam where different portions of the beam will strike each of the light sensitive elements, aneroid bellows, means operable in response to changes in atmospheric pressure for moving one of said units relatively to the other units in a direction which will move the beam relative to the light sensitive elements and change the differential between the quantum of light striking one light sensitive element to the quantum of light striking the other light sensitive element, and circuit means for producing a signal indicative of said differential.

15. Apparatus according to claim 14 in combination with an aircraft having altitude-affecting control surfaces, and means for moving said control surfaces in response to the signal produced by the circuit means.

16. Apparatus for detecting the relative positioning of a pair of relatively movable members, comprising photosensitive means including two photosensitive elements which are stationary with respect to each other and are optically separated by a dividing line, means for directing a beam of light to form a spot which strikes the dividing line and both photosensitive elements so that one of the photosensitive elements is struck by a first portion of the beam and the other photosensitive element is struck by a second portion of the beam, said means for directing a beam of light including a light source element and a light-interrupting element, means for changing the area differential between the light striking one light sensitive element and the light striking the other light sensitive element by producing movement between the spot and the photosensitive means, circuit means for producing a signal indicative of said differential, and adjustment means permitting variations in the sensitivity of the apparatus, said adjustment means including means permitting changes in inclination between the light-interrupting element and the dividing line to change the dimension of the beam measured along the dividing line and vary the area of the spot moving across the dividing line during relative movement of the spot for any given distance.